United States Patent [19]
Sorensen

[11] 3,765,277
[45] Oct. 16, 1973

[54] PNEUMATIC WIRE STRIPPER HAND GUN

[75] Inventor: William W. Sorensen, North Reading, Mass.

[73] Assignee: Western Electric Company, Incorporated, New York, N.Y.

[22] Filed: July 6, 1971

[21] Appl. No.: 159,880

[52] U.S. Cl. .............................................. 81/9.5 A
[51] Int. Cl. ........................................... H02g 1/12
[58] Field of Search ............... 81/9.51, 9.5 A, 9.5 R

[56] References Cited
UNITED STATES PATENTS

| | | | |
|---|---|---|---|
| 3,176,550 | 4/1965 | Marcotte | 81/9.51 |
| 3,222,957 | 12/1965 | Kramer et al. | 81/9.51 |
| 2,285,167 | 6/1942 | Montgomery | 81/9.51 |
| 2,735,320 | 2/1956 | Green | 81/9.5 A |
| 1,666,277 | 4/1928 | White | 81/9.51 |

Primary Examiner—Donald G. Kelly
Assistant Examiner—Roscoe V. Parker
Attorney—W. M. Kain et al.

[57] ABSTRACT

A pneumatically operated, hand-held wire stripper device includes cooperating gripping members and cutting members. An end of the wire is inserted into the device and a trigger is actuated to close the cutting members to sever the insulation without nicking the wire. Closure of the cutting members controls the movement of the gripping members to hold the wire. The cutting members are then displaced from the gripping members to strip the severed insulation from the wire. The cutting and gripping members are subsequently opened to disengage the wire and, upon release of the trigger, the cutting members are returned to the initial position. The cutting members may be adjusted for accommodating different sizes of wire.

10 Claims, 6 Drawing Figures

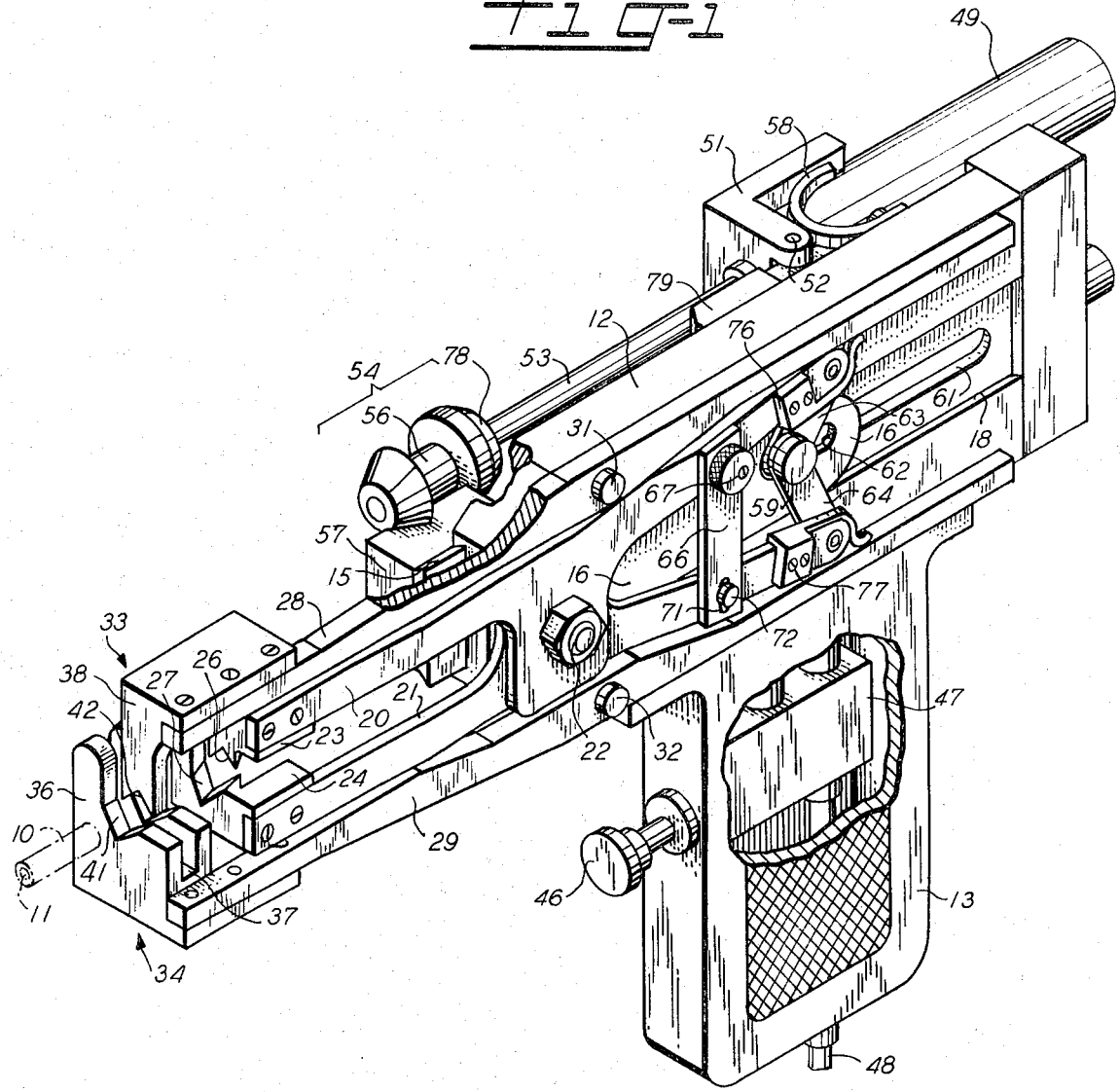

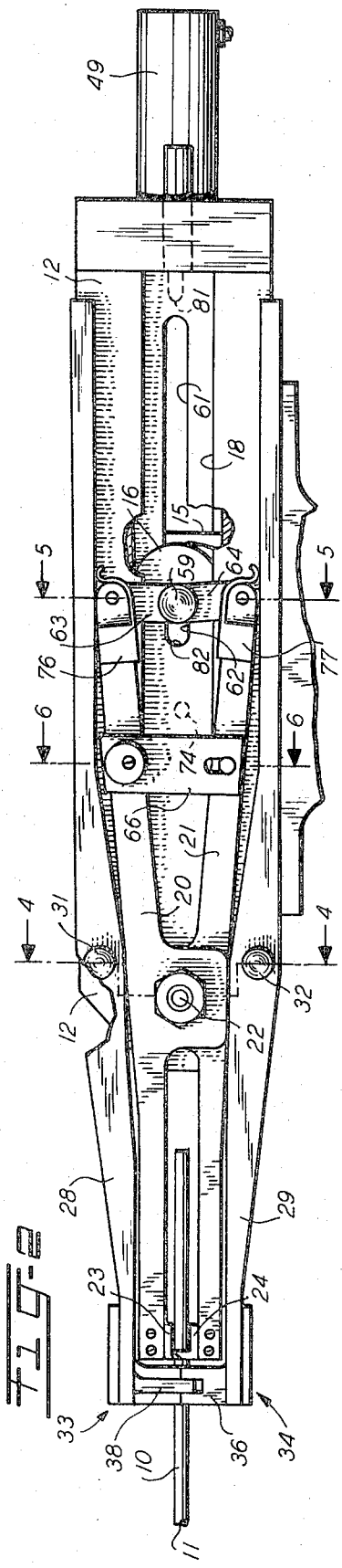
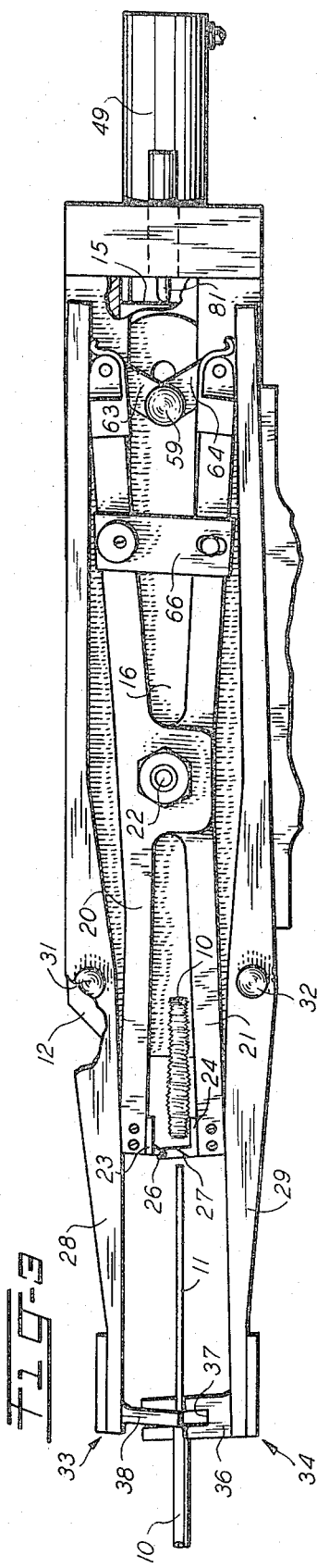
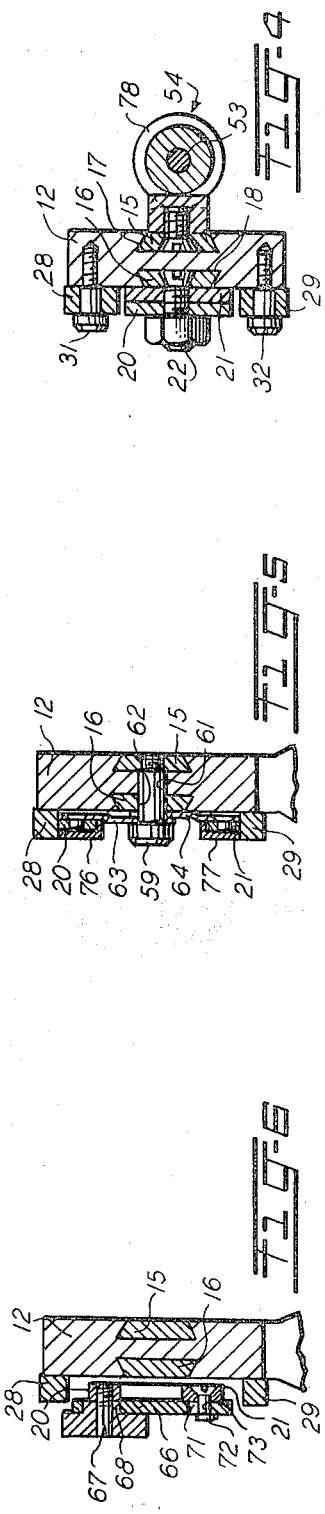

PNEUMATIC WIRE STRIPPER HAND GUN

BACKGROUND OF THE INVENTION

1. Field of the Invention

This invention relates to a pneumatically operated wire stripping device, and more specifically, to a pneumatic hand-gun type of wire stripper wherein operation of a trigger initiates operation of wire cutters and grippers to strip insulation from the wire and restores the cutters and grippers to an initial position.

2. Description of the Prior Art

The manufacture and repair of electrical equipment, particularly in the field of telephony, often requires numerous wire conductors. Where insulated wire is used, a length of insulation must usually be stripped from the end of the wire prior to terminating the wire.

In the design of any wire stripping device, it is of utmost importance that the insulation be stripped without nicking or scoring or otherwise damaging the underlying wire. If the wire is scored or nicked, it may be broken in a subsequent handling or securing operation. For example, where the wire is secured to a terminal by a wire wrapping operation, considerable tension is applied to the wire, and unless stress concentrations due to nicks or scrapes are avoided, the wire may break. Also, surface damage may create stress concentrations which make the wire susceptible to fatigue failure, particularly if the equipment in which it is used is subjected to vibrations, or may alter the electrical characteristics of the wire.

Another important design consideration is the adaptability of the wire stripping device to wires of different thicknesses, since the wiring of even a single electrical component may require different gauges of wire. For efficiency in the wire stripping operation, a wire stripping device should be readily adaptable to different gauge wires without nicking or scraping the wires.

Of the diverse types of wire strippers that have been designed, hand tool types are frequently used for electrical applications because of size and mobility considerations. Often, the hand tool wire stripper is manually operated and spring biased, requiring a considerable expenditure of manual energy. In addition, many of the prior art devices are not readily adaptable to stripping wires of different thicknesses, thus presenting problems of inefficiency and wire damage.

It may thus be appreciated that there is a need for a self-powered hand tool wire stripper which is positive acting and adaptable to stripping various thicknesses of insulated wire without nicking or otherwise damaging the wire.

SUMMARY OF THE INVENTION

The present invention contemplates a pneumatically operated, hand-held wire stripper device suitable for gripping an insulated wire, stripping a length of insulation from one end of the wire, and then resetting itself for a subsequent operation.

In view of the aforementioned need for a device that is adaptable to different wire thicknesses, the present invention further contemplates a device having a readily adjustable pair of cutting members cooperating with a pair of gripping members for adapting the device to hold and strip various sizes of insulated wire.

More particularly, the present invention may take the form of a hand-gun type wire stripper device, including a pair of cutter jaw blades pivotally mounted on a carrier slide and a pair of gripper jaws pivotally mounted on a frame. Normally, both the cutter jaw blades and the gripper jaws are open to receive a section of wire. Upon trigger actuation of a pneumatically controlled slide mechanism in a first direction, a toggle linkage functions to pivot the cutter jaw blades to sever the insulation. Pivotal movement of the cutter jaw blades pivots the gripper jaws to grip an insulated section of the wire. The slide mechanism, upon continued movement, displaces the carrier slide and cutter jaw blades to strip the insulation from the wire. The slide mechanism is then moved in a reverse direction, to pivotally open the cutter jaw blades and gripper jaws and to return the carrier slide and cutter jaw blades into position to receive another wire.

BRIEF DESCRIPTION OF THE DRAWINGS

FIG. 1 is an isometric view of a wire stripper device embodying the principles of the present invention;

FIG. 2 is a partial side view of the wire stripper device of FIG. 1 showing gripper jaws and cutter jaw blades closed about an insulated wire;

FIG. 3 is a partial side view of the wire stripper device of FIG. 1 showing the open position of the gripper jaws and cutter jaw blades subsequent to a length of insulation being stripped from the wire; and FIGS. 4, 5, and 6 are cross-sectional views, taken along lines 4—4, 5—5, and 6—6 of FIG. 2, showing the arrangement of and cooperation among various elements of the wire stripping device.

DETAILED DESCRIPTION

Referring to FIG. 1, there is shown a wire stripper hand gun embodying the principles of the present invention which may be used to sever and strip a length of insulation 10 from a wire 11. The gun includes a frame 12 and a handle 13. Referring also to FIG. 4, a driving slide 15 and a carrier slide 16 having beveled edges ride within dovetail slots 17 and 18 formed on opposite sides of the frame 12. A pair of cutter actuator levers 20 and 21 are pivotally mounted on a stud bolt 22 extending from the carrier slide 16 and, in turn, mount a pair of cutter jaw blades 23 and 24. As shown in FIGS. 1–3, cutter jaw blades 23 and 24 have beveled, V-shaped knife edges 26 and 27, respectively, which cooperate in severing the insulation 10 on wire 11. A pair of gripper actuator levers 28 and 29 are pivotally mounted on studs 31 and 32 extending from the frame 12 and mount a pair of gripper jaws 33 and 34. Gripper jaw 34 includes a vertical projection 36 having a transverse slot 37 for receiving a vertical projection 38 of gripper jaw 33. These projections 36 and 38 have V-shaped slots 41 and 42 which cooperate in holding the insulated wire 11.

The handle 13 of the gun includes a trigger 46 for controlling a four-way valve 47 which, in turn, controls the application of air from a hose 48 to front and rear ends of an air cylinder 49 which functions as the power source for operating the cutter jaw blades 23 and 24 and the wire gripper jaws 33 and 34. The air cylinder 49 is mounted on a bracket 51 which is pivotally mounted on a pin 52 extending from a projecting section of the frame 12.

The admission of air to the cylinder 49 moves a piston 53 to advance or retract a collar latch 54. The collar latch is provided with a circumferential groove 56 for receiving a notched drive plate 57 mounted on the driving slide 15. A pair of curved leaf springs 58—58, only one of which is shown in FIG. 1, are interposed between the frame 12 and the bracket 51 to bias the cylinder 49 and the piston 53 in a counterclockwise direction about pin 52 to urge the collar latch 54 into receiving the notched drive plate 57. The air cylinder 49, in advancing or retracting the piston 53, thus imparts like movement to the drive plate 57 and also the driving slide 15.

As shown in FIGS. 1 and 5, a drive pin 59 extends from the driving slide 15 through a slot 61 formed in the frame 12 and through a slot 62 formed in carrier slide 16. Pivotally mounted on the end of the drive pin 59 are toggle links 63 and 64, which are also pivotally connected to the ends of cutter actuator levers 20 and 21. Forward or backward movement of the driving pin 59 thus opens or closes toggle links 63 and 64 to pivot cutter actuator levers 20 and 21, which, in turn, pivot gripper actuator levers 28 and 29, to open or close cutter jaw blades 23 and 24 and gripper jaws 33 and 34.

Referring to FIGS. 1 and 6, the extent of pivotal movement of the cutter actuator levers 20 and 21 and, hence, the extent of cut by the cutter jaw blades 23 and 24 may be controlled by a plate 66 secured at one end to cutter actuator lever 20 by an adjustment screw 67 having an eccentric shank 68 extending through an opening in the plate 66. The opposite end of the plate 66 is provided with a slot 71 for receiving a rivet-like stud 72 extending from cutter actuator lever 21. When the adjusting screw 67 is turned, the eccentric shank 68 displaces the plate 66 to change the spacing between the adjustment screw and a lower surface 73 of slot 71. This spacing determines the maximum distance between the adjustment screw 67 and the rivet stud 72 when cutter actuator levers 20 and 21 are pivoted by toggle links 63 and 64 to close cutter jaw blades 23 and 24, and thereby limits the extent of cut by the cutter jaw blades. Thus, adjustment of the screw 67 adapts the wire stripper to cut insulation on wires of different thickness without scraping or nicking the wire.

Referring again to FIG. 1, with the piston 53 fully extended and the collar latch 54 engaging drive plate 57, the toggle links 63 and 64 maintain cutter jaw blades 23 and 24 and gripper jaws 33 and 34 in an open position. When the piston is retracted from the position shown in FIG. 1, driving slide 15 is moved to the right to move drive pin 59 to the right to pivotally straighten toggle links 63 and 64 as shown in FIG. 2. Upon initial movement of the driving slide 15 to the right, the carrier slide 16 is restrained from movement by a washer-like spring 74 which bears against the inner side of the carrier slide, tending to wedge the slide in its dovetail slot 18. Drive pin 59 thus pivots the toggle liks, and the toggle links pivot the cutter actuator levers 20 and 21 to close cutter jaw blades 23 and 24 about the insulated wire 11, without displacement of carrier slide 16. Additionally, the pivotal movement of cutter actuator levers 20 and 21 pivots gripper actuator levers 28 and 29 to close gripper jaws 33 and 34 about the insulated wire 11. A pair of spring clips 76 and 77 having stiff, resilient curved tangs, see also FIG. 5, are mounted on the rear sections of cutter actuator levers 20 and 21 to maintain effective contact between the ends of levers 20 and 21 and the inner sides of gripper actuator levers 28 and 29. The spring clips 76 and 77 permit adjustment of the cutter jaw blades 23 and 24 while maintaining contact between the two pairs of levers, and also allow the gripper jaws 33 and 34 to firmly grip the wire insulation without hindering the completion of closing of the cutter jaw blades or the resultant severing of the insulation.

As mentioned previously, the extent of pivotal movement of cutter actuator levers 20 and 21 and the depth of cut by cutter jaw blades 23 and 24 are determined by the variable spacing between adjustment screw 67 and the lower surface 73 of slot 71. Thus, upon engagement of the rivet stud 72 on pivoting cutter actuator lever 21 with the lower surface 73 of the slot 71, the pivotal movement of cutter actuator levers 20 and 21 and of toggle links 63 and 64 is terminated. Continued movement to the right of drive pin 59 thrusts the locked toggle links and the carrier slide 16 to the right, overcoming the frictional force exerted by spring 74, and displacing the closed cutter jaw blades 23 and 24 from the gripper jaws 33 and 34 to strip the severed insulation 10 from the wire 11.

In order to release the gripper jaws 33 and 34 and the cutter jaw blades 23 and 24 following an insulation stripping operation, the collar latch 54 is provided with an annular cam surface 78 which engages a stationary cam 79 secured to the frame as the piston moves to the withdrawn position. When the annular cam surface 78 engages the stationary cam 79, the collar latch 54 is pivoted in a clockwise direction about pin 52 to release the drive plate 57, allowing a spring-loaded pin 81, shown in FIGS. 2 and 3, to thrust the driving slide 15 forward. As the driving slide is moved forward, the drive pin 59 moves to the left, as shown in FIG. 3, to pivotally break the toggle links 63 and 64, thereby pivoting the cutter actuator levers 20 and 21 to open cutter jaw blades 23 and 24. As the levers 20 and 21 pivot, the inner forward sections of gripper actuator levers 28 and 29 are engaged to open gripper jaws 33 and 34. The trigger 46 may then be released, admitting air to the rear of the cylinder 49 to advance the piston 53 and collar latch 54, whereupon the annular cam surface 78 disengages from the stationary cam 79 and the collar latch is pivoted in a counterclockwise direction by the pair of curved leaf springs 58—58 to receive the notched drive plate 57. The advancing collar latch 54 then thrusts the driving slide 15 and drive pin 59 forward. The carrier slide 16 is initially restrained from forward movement by the washer-like spring 74 until the plate 66 stops the pivotal movement of the toggle links 63 and 64, thereby locking the toggle links, or alternately, until the drive pin 59 engages a front surface 82, shown most clearly in FIG. 2, of the slot 62 in carrier slide 16, whereupon, in either instance, the drive pin overcomes the restraining force exerted by spring 74 and thrusts the carrier slide forward to return the open cutter jaw blades 23 and 24 to the position adjacent the open gripper jaws 33 and 34 shown in FIG. 1.

In considering a complete cycle of operation of the wire stripping device, assume that the piston 53 is initially in the full forward position and the two sets of jaws are open as shown in FIG. 1. A section of insulated wire 11 is inserted between the open jaws. The trigger 46 is depressed, admitting air to the forward end of the cylinder 49, whereupon the piston 53 is withdrawn into the cylinder, moving the collar latch 54 to the right. Movement of the collar latch is imparted to the notched drive plate 57 and to the driving slide 15 which, in turn, imparts motion to the drive pin 59. The carrier slide 16 will be initially restrained from movement due to the action of the washer-like spring 74, so that the drive pin 59 rides within slot 62 and straightens the toggle links 63 and 64 to pivot the cutter actuator levers 20 and 21 and move the tangs of spring clips 76 and 77 to pivot the gripper actuator levers 28 and 29. These levers 28 and 29 pivot the gripper jaws 33 and 34 into engagement with the insulation 10. Upon gripping of the insulation and further pivotal movement of the levers 20 and 21, the cutter jaw blades 23 and 24 are moved to cut the insulation as shown in FIG. 2.

Further movement of the piston 53 into the cylinder 49 is accompanied by simultaneous movement of the driving slide 15 and the carrier slide 16. This is accomplished because the levers 20 and 21 are now prevented from further pivotal movement by plate 66 and lock the toggle links 63 and 64 in place. Cutter jaw blades 23 and 24 are thus moved away from the gripper jaws 33 and 34 to strip the insulation.

As the collar latch 54 continues to move backwardly, the annular cam surface 78 engages the stationary cam 79 to pivot the collar latch away from the frame 12 to release the drive plate 57, whereupon the now compressed, spring-loaded pin 81 imparts a slight leftward movement to the driving slide 15. The driving slide moves the drive pin 59 toward the left and within the slot 62 to break the toggle links 63 and 64, thereby pivoting the cutter actuator levers 20 and 21 and the gripper actuator levers 28 and 29 to move the cutter jaw blades 23 and 24 and the gripper jaws 33 and 34 from the stripped wire as shown in FIG. 3. The trigger 46 may now be released, whereupon the piston 53 and the collar latch 54 move to the left and the collar latch again engages the drive plate 57 to move the driving slide 15, the carrier slide 16, the cutter actuator levers 20 and 21, and the open cutter jaw blades 23 and 24 to the forward or initial position in anticipation of another wire stripping operation.

It is to be understood that the above-described embodiments are simply illustrative of the invention and that numerous other embodiments can be devised without departing from the spirit and scope of the invention.

What is claimed is:

1. In a wire stripping device, which comprises:
   a frame;
   a pair of gripper jaw means pivotally mounted on said frame for gripping an insulated wire therebetween;
   a slide mounted on said frame;
   a pair of levers having cutting blades mounted on first ends thereof pivotally mounted on said slide and cooperating with said pair of gripper jaw means for pivotally opening and closing said pair of gripper jaw means;
   a pair of toggle links pivotally connected at first ends to the second ends of said pair of cutting blade levers; and
   driving means including a pin pivotally mounting the second ends of said toggle links for (1) pivoting said toggle links to pivotally close said gripping jaw means and cutting blade levers to grip and sever the insulation, and engaging said slide upon the pivoting of said toggle links for (2) moving the slide to withdraw the levers and cutting blades to strip the severed insulation from the wire.

2. In a wire stripping device, which comprises:
   a frame;
   gripping means mounted on said frame;
   cutting means for operating said gripping means in unison with said cutting means;
   a first slide mounted on said frame for movement along said frame and mounting said cutting means to said first slide;
   a second slide mounted on said frame for movement along said frame;
   means for moving said second slide along the frame; and
   means mounted on said second slide for operating said cutting means upon an initial movement of said second slide to operate said gripping means to move said gripping means and said cutting means into engagement with an insulated wire and for moving said first slide upon continued movement of said second slide to move said cutting means along the wire to strip the insulation from the wire.

3. In a wire stripping device, which comprises:
   a frame;
   gripping means mounted on said frame;
   cutting means for operating said gripping means in unison with said cutting means;
   a first slide mounted on said frame for movement along said frame and mounting said cutting means to said first slide;
   a second slide mounted on said frame for movement along said frame;
   means for moving said second slide along said frame;
   means mounted on said second slide for operating said cutting means upon an initial movement of said second slide to operate said gripping means to move said gripping means and said cutting means to grip and cut the insulation; and
   means mounted on said first slide for limiting the cutting movement of said cutting means whereupon continued movement of said second slide moves said first slide and said cutting means to strip the insulation from the wire.

4. In a wire stripping device, which comprises:
   a frame;
   a pair of gripper jaw means pivotally mounted on said frame for gripping an insulated wire positioned therebetween;
   a pair of levers having cutter blades on first ends thereof for cutting the insulation on the wire;
   a slide mounted on said frame;
   means mounting said levers on said slide with the second ends thereof engaging said gripper jaw means for pivoting said gripper jaw means to grip the insulated wire;
   means for pivoting said levers and blades to (1) sever the insulation on the wire and to (2) pivot said gripper jaw means to grip the wire; and
   means actuated by said pivoting means and rendered effective upon pivoting of said levers and said gripper jaw means for moving said slide to withdraw said levers and blades to strip the severed insulation from the wire.

5. A wire stripping device, comprising:
   a frame;
   a pair of levers having cutter blades on one end thereof mounted on said frame for pivotal movement toward each other to sever the insulation on an insulated wire and for movement along the length of the wire to strip the insulation from the wire;

a pair of gripper jaws pivotally mounted on said frame for movement toward each other in response to the pivoting of said pair of cutter blades to grip the insulated wire;

a slide mounted on said frame;

drive means mounted on said frame for moving said slide;

means adjustably in engagement with said pair of levers for terminating the pivotal movement of said levers upon said cutter blades severing the insulation on the wire; and means, including a pair of toggle links, rendered effective by the movement of said slide for (1) pivoting said pair of levers to pivot said gripper jaws to grip and sever the insulation and for (2) moving said levers along the length of the wire upon termination of the pivoting of said levers to strip the insulation from the wire.

6. In a wire stripper:

a frame;

a first pair of levers pivotally mounted in spaced relation on said frame;

jaw members mounted on first ends of said first levers and projecting toward each other for gripping an insulated wire;

a slide moveably mounted on said frame and interposed between said first levers;

a second pair of levers pivotally mounted on said slide with first and second ends thereof positioned in alignment with the inner sides of the first and second ends of said first levers;

cutter means secured to the first ends of said second levers and projecting toward each other for severing the insulation on the wire;

resilient means projecting from the second ends of said second levers for engaging the inner sides of the second ends of said first levers;

means for pivoting said second levers to move said resilient means to pivot said first levers to move said gripping jaws to hold the insulated wire and to move said cutter means to sever the insulation;

means rendered effective upon pivoting of said first and said second pairs of levers for moving said slide to move said second levers along said first levers and for moving said cutter means to strip the severed insulation from the wire.

7. A wire stripper as recited in claim 6 further comprising:

plate means, including an adjustment screw, spanning said second pair of levers for presetting the extent of pivotal movement of said second pair of levers to limit the movement of said cutter means in severing the insulation.

8. A wire stripping device, comprising:

a frame;

means moveably mounted on said frame for gripping an insulated wire;

cutting means moveably mounted on said frame for movement away from and toward said gripping means and for movement to sever the insulation on the wire;

a slide mounted on said frame for forward and backward movement;

a pneumatic cylinder pivotally mounted on said frame having a piston;

means for latching said piston to said slide;

means operated by said slide and rendered effective upon the backward movement of said slide for moving said gripping means and said cutting means into engagement with the insulated wire to grip and sever the insulation and for moving said cutting means away from said gripping means to strip the severed insulation from the wire;

camming means mounted on said frame for pivoting said cylinder to disconnect said latching means to disengage said piston from said slide upon continued backward movement of said piston subsequent to the stripping of the insulation from the wire; and means activated upon disengagement of said piston from said slide for moving said slide in the forward direction to move said gripping means and said cutting means from the wire.

9. A wire insulation stripping tool, which comprises:

a frame;

a pair of levers pivotally mounted on said frame having gripping surfaces on first ends thereof for holding an insulated wire;

a pair of slides;

means for mounting said slides on opposite sides of said frame;

a pair of levers having cutting blades on first ends thereof pivotally mounted on a first of said slides and cooperating with said gripping levers for opening and closing said gripping levers;

a pair of toggle links having first ends pivotally connected to second ends of said cutting levers;

a drive pin interconnecting said second slide and second ends of said toggle links;

a pneumatic cylinder having a piston engaging the second of said slides for moving said second slide backward and forward, whereupon the backward movement of said slide moves said drive pin to (1) pivot said toggle links to pivotally close said cutting levers and said gripping levers about the insulated wire to hold and sever the insulation and to (2) retract said first slide and move said cutting levers away from said gripping levers to strip the insulation from the wire;

a camming plate mounted on said frame for disengaging said backwardly moving piston from said second slide subsequent to the insulation being stripped; and means rendered effective upon disengagement of said piston from said second slide for moving said second slide in the forward direction to pivotally open said cutting and gripping levers.

10. A pneumatic wire insulation stripping tool, which comprises:

a frame;

a pair of wire gripping jaws pivotally mounted on said frame;

a first reciprocable slide carried by said frame;

a pair of insulation cutting blades pivotally mounted on said first slide, normally positioned adjacent to said wire gripping jaws by said first slide, and cooperating with said gripping jaws to pivotally open and close said gripping jaws;

plate means spanning said cutting blades to adjustably limit the extent of pivotal movement of said blades upon closing;

a second slide mounted on said frame for reciprocal movement parallel to said first slide;

an air cylinder mounted on said frame for limited pivotal movement transverse to the direction of movement of said first and second slides having a reciprocable piston engaging said second slide;

a valve in communication with said air cylinder having a trigger for directing the passage of air to said cylinder to reciprocate said piston;

means including a toggle linkage cooperating with said first and said second slides and said cutting blades for pivotally closing said gripping jaws and said cutting blades about an insulated wire to grip and sever the insulation and for moving said first slide to move said closed cutting blades from the position adjacent said gripping blades upon withdrawal of said piston from a fully extended position to strip the insulation from the wire;

camming means cooperating with said air cylinder for pivoting said cylinder to disengage said piston from said second slide as said piston approaches a fully retracted position;

means rendered effective upon disengagement of said piston from said second slide for advancing said second slide to actuate said toggle linkage means to pivotally open said cutting blades and gripping jaws; and means for pivoting said cylinder to re-engage said piston with said second slide upon advancement of said piston subsequent to said cutting blades and said gripping jaws being pivotally opened, whereupon advancement of said piston to the fully extended position moves said first slide to return said opening cutting blades to the position adjacent said open gripping jaws.

* * * * *